US006900982B2

(12) United States Patent
Chang et al.

(10) Patent No.: US 6,900,982 B2
(45) Date of Patent: May 31, 2005

(54) MULTIPURPOSES MEMORY CARD CONNECTOR

(75) Inventors: Cheng-Tsai Chang, Yungho (TW); Chun-Chih Huang, Tainan (TW); Yu-Hui Chien, Chungho (TW); Yi-Fen Huang, Sanchung (TW)

(73) Assignee: Teconn Electronics Inc., Taipei Hsien (TW)

( * ) Notice: Subject to any disclaimer, the term of this patent is extended or adjusted under 35 U.S.C. 154(b) by 26 days.

(21) Appl. No.: 10/694,856

(22) Filed: Oct. 29, 2003

(65) Prior Publication Data

US 2005/0094364 A1 May 5, 2005

(51) Int. Cl.[7] .................................................. G06F 1/16
(52) U.S. Cl. ........................ 361/685; 361/818; 439/326; 235/441
(58) Field of Search ................................. 361/724–727, 361/677–687, 737, 816; 439/630, 377, 325, 326, 377.1; 235/441

(56) References Cited

U.S. PATENT DOCUMENTS

| 5,823,828 A | * 10/1998 | Bricaud et al. ............. 439/630 |
| 6,115,257 A | * 9/2000 | Laity ........................... 361/737 |
| 6,711,010 B2 | * 3/2004 | Wei et al. ................... 361/684 |

* cited by examiner

Primary Examiner—Hung Van Duong
(74) Attorney, Agent, or Firm—Bacon & Thomas PLLC (57) ABSTRACT

A multipurpose memory card connector includes an electrically insulative housing defining a front-open receiving open chamber, the housing having a first set of terminals disposed at the rear side inside and second and third sets of terminals disposed near the front open side of the receiving open chamber, and a slide slidably mounted inside the receiving open chamber, the slide having a first stop face disposed at a rear bottom side thereof and second and third stop faces respectively spaced from the first stop face at a distance adapted to receive insertion force from one of a number of memory cards for enabling the slide to be moved in the receiving open chamber at a distance subject to the type of the memory card being inserted into the receiving open chamber.

6 Claims, 8 Drawing Sheets

MULTIPURPOSES MEMORY CARD CONNECTOR

BACKGROUND OF THE INVENTION

1. Field of the Invention

The present invention relates to a memory card connector adapted to connect a memory card to a circuit board and, more particularly, to a multipurpose memory card connector, which is compatible to any of a variety of memory cards.

2. Description of the Related Art

Following fast development of computer technology, various high operation speed computers with multiple functions have been developed. Further, various electronic cards including memory cards, network cards, modern cards, SCSI (hard disk, scanner) cards may be used with a computer to add functions to the computer. Typically, an electronic card has a PCMCIA (Personal Computer Memory Card International Association) interface. Adapters to connect PCMCIA interface to other interfaces, for example, PCMCIA to SCSI, PCMCIA to IDE, etc. are commercially available. These adapters enable a notebook computer to use peripheral apparatus for PC. Regular notebook computers support plug-and-play, and have a hot plug function. There are commercially available electronic cards for use in a PDA or palm-top electronic dictionary. Except PCMCIA type memory cards, there are MMCs (Multimedia Cards), CFs (CompactFlash Cards), SMCs (Smart Media Cards), MSs (Memory Sticks), SDs (Secure Digital Memory Cards) available on the market.

Further, for receiving an electronic card, a circuit board is provided with a card connector. Because different electronic cards have different sizes, different card connectors shall be used to receive different electronic cards. However, providing a circuit board with different card connectors for receiving different electronic cards greatly increase the installation space of the circuit board. Further, the terminals of a conventional card connector are alternatively arranged at different elevations. This terminal arrangement design requires much installation space. Therefore, it is desirable to provide a memory card connector that eliminates the aforesaid drawbacks.

SUMMARY OF THE INVENTION

The present invention has been accomplished under the circumstances in view. It is therefore the main object of the present invention to provide a multipurpose memory card connector, which fits any of a variety of electronic cards. It is another object of the present invention to provide a multipurpose memory card connector, which quickly holds the electronic card in position upon its insertion and, automatically ejects the inserted electronic card when pressed by the user. To achieve these and other objects of the present invention, the multipurpose memory card connector comprises an electrically insulative housing and a slide mounted inside the electrically insulative housing and adapted to receive one of a set of memory cards, wherein the electrically insulative housing comprises a receiving open chamber, the receiving open chamber having a front open side for the insertion of one of the memory cards and a plurality of guide grooves symmetrically disposed at two sides of the front open side and adapted to guide one of the memory cards into the receiving open chamber, a first set of terminals disposed at a rear side inside the receiving open chamber for the contact of one the memory card, and at least one second set of terminals disposed near the front open side of the receiving open chamber for the contact of one the memory card respectively; the slide is mounted inside the receiving open chamber of the electrically insulative housing and movable in the receiving open chamber upon insertion of one the memory card, having a first stop face disposed at a rear bottom side thereof and at least one second stop face respectively spaced from the first stop face at a distance, the first stop face and the at least one second stop face being adapted to receive insertion force from one the memory card for enabling the slide to be moved in the receiving open chamber at a distance subject to the type of the memory card being inserted into the receiving open chamber.

DETAILED DESCRIPTION OF THE PREFERRED EMBODIMENT

Figure 1:
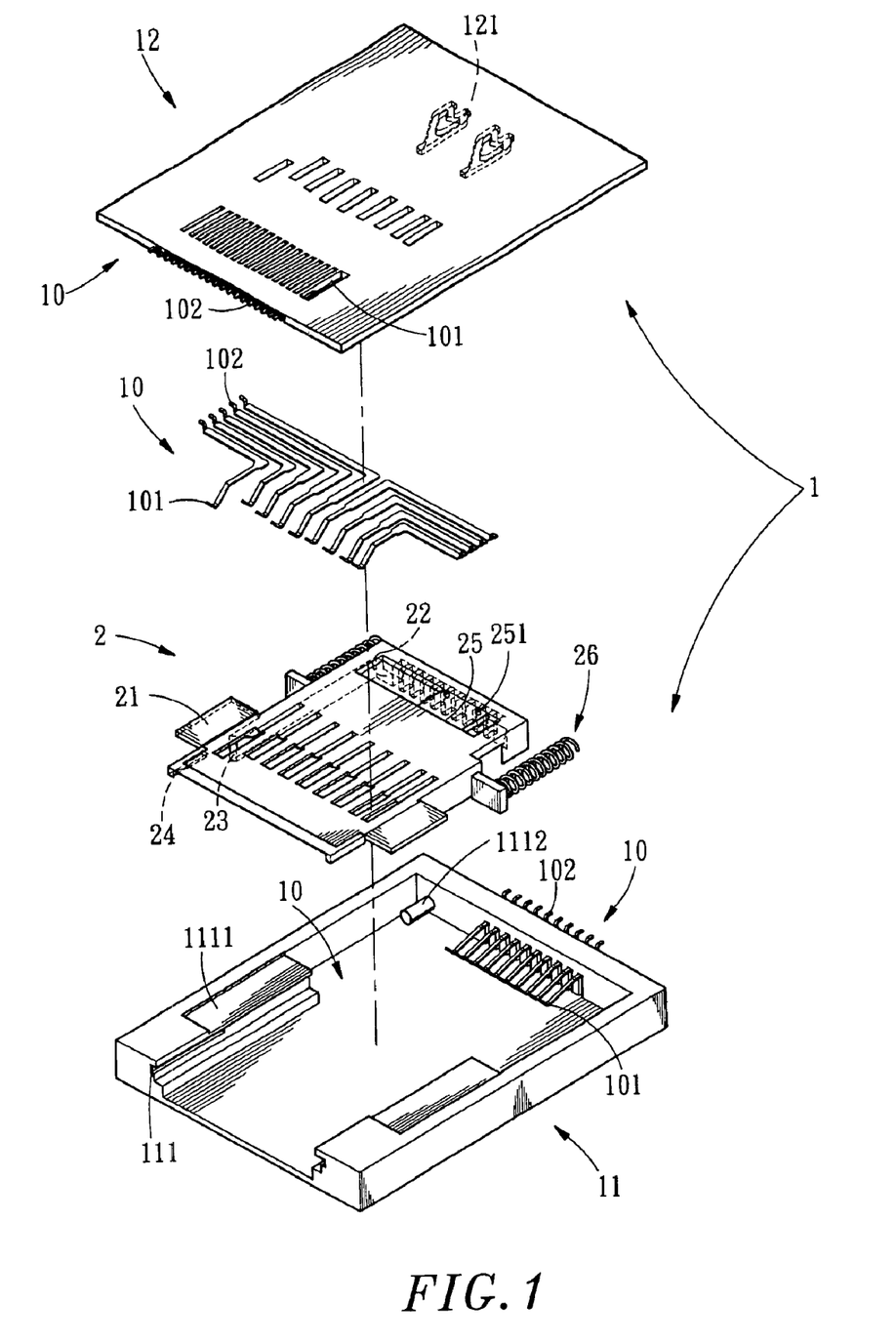
FIG. 1 is an exploded view of a multipurpose memory card connector according to the present invention.
Figure 2:
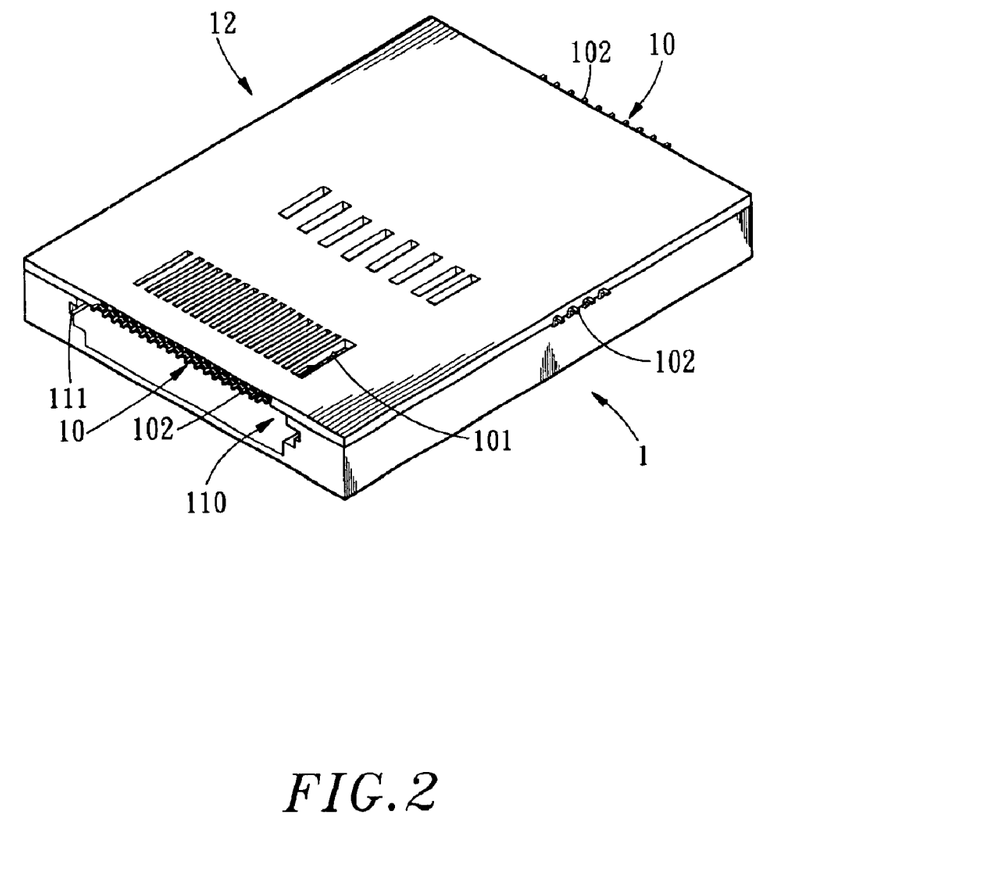
FIG. 2 is an elevational view of the multipurpose memory card connector according to the present invention.
Figure 3:
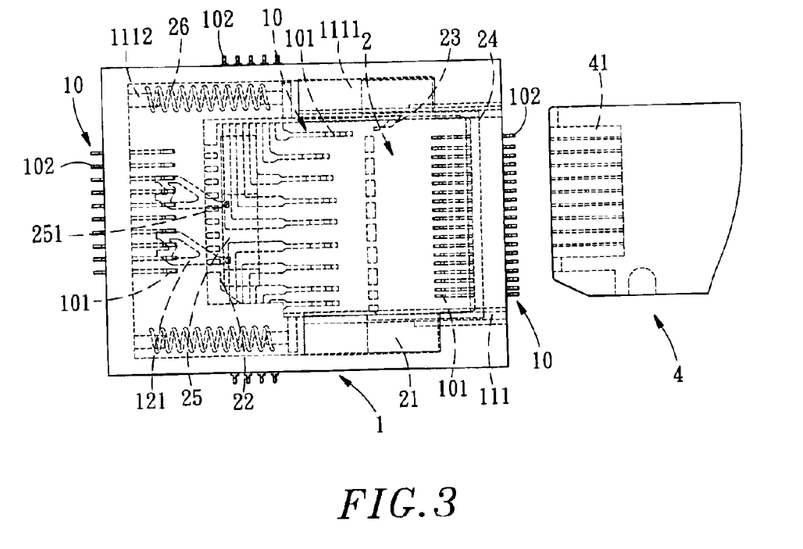
FIG. 3 is a top view of the present invention before insertion of a MS memory card.
Figure 3A:
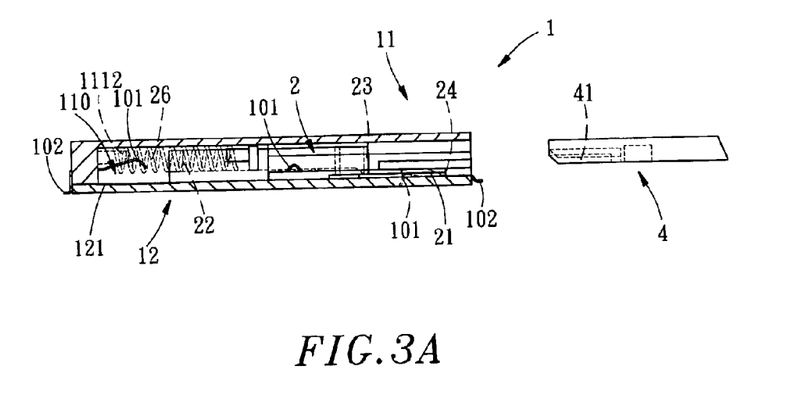
FIG. 3A is a side view of FIG. 3.
Figure 4:
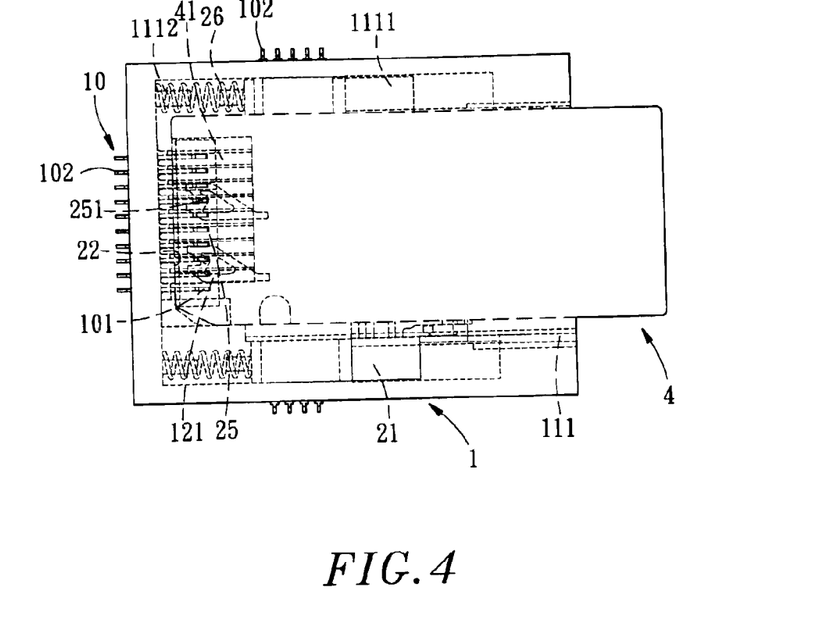
FIG. 4 is similar to FIG. 3 but showing the MS memory card inserted into the housing.
Figure 4A:
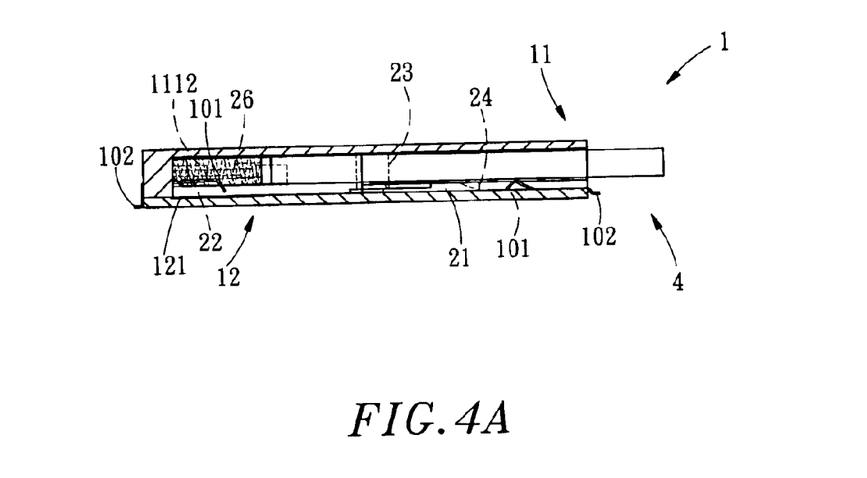
FIG. 4A is a side view of FIG. 4.
Figure 5:
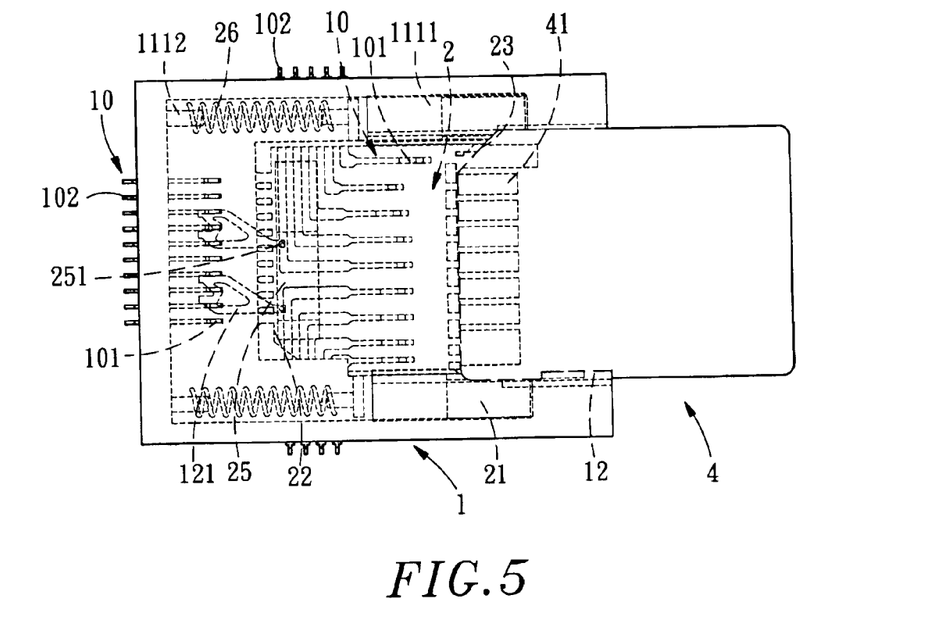
FIG. 5 is a top view of the present invention before insertion of a SD memory card.
Figure 5A:
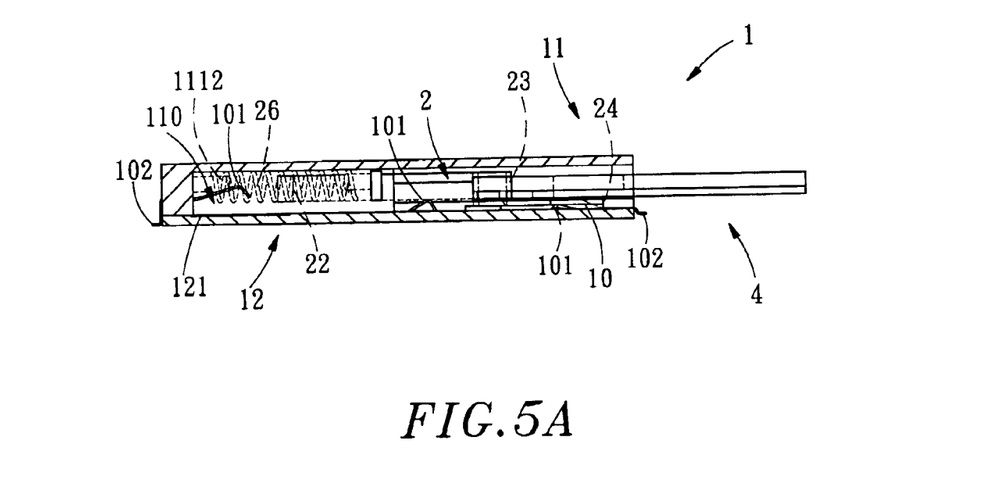
FIG. 5A is a side view of FIG. 5.
Figure 6:
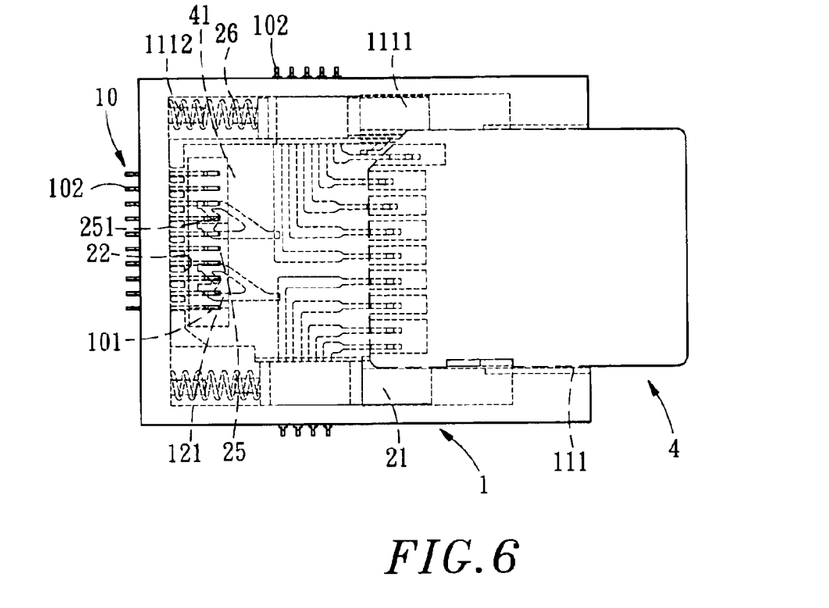
FIG. 6 is similar to FIG. 5 but showing the SD memory card inserted into the housing.
Figure 6A:
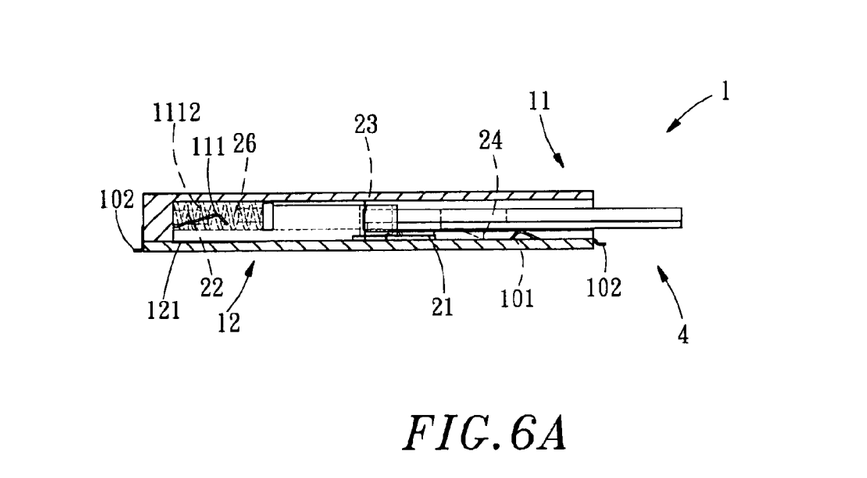
FIG. 6A is a side view of FIG. 6.
Figure 7:
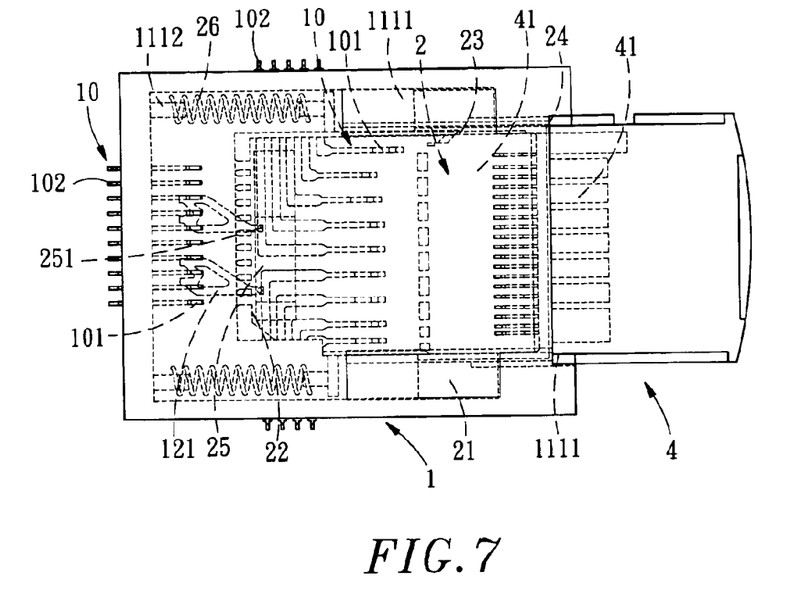
FIG. 7 is a top view of the present invention before insertion of a XD memory card.
Figure 7A:
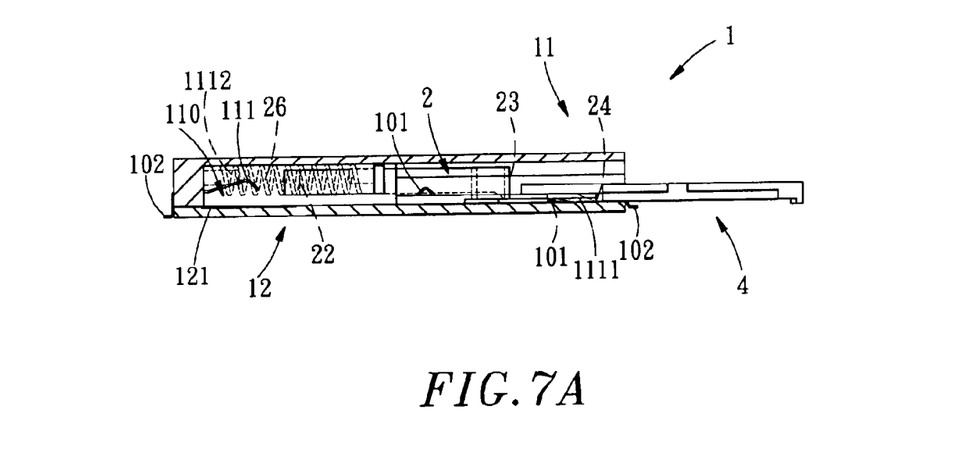
FIG. 7A is a side view of FIG. 7.
Figure 8:
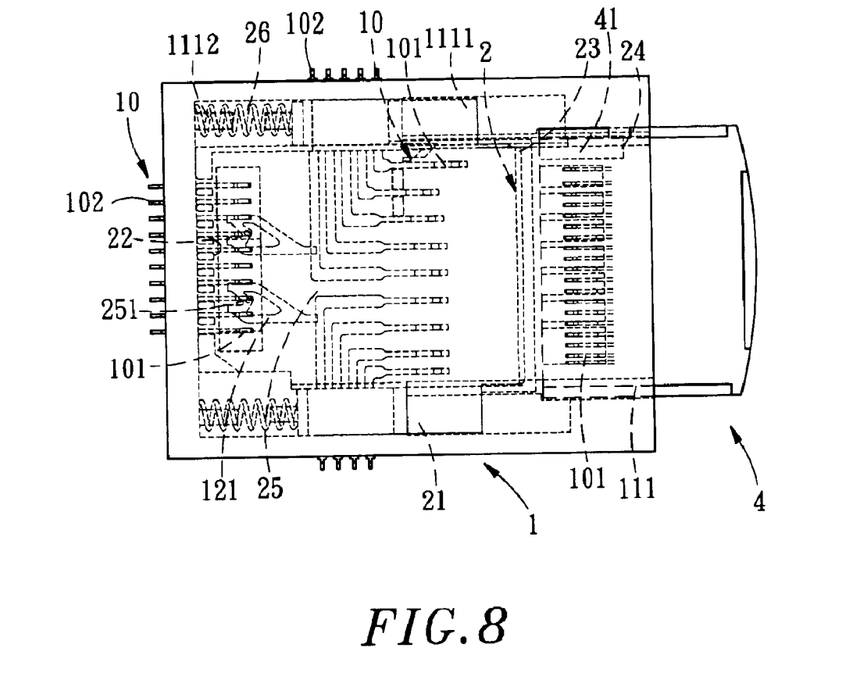
FIG. 8 is similar to FIG. 7 but showing the XD memory card inserted into the housing.
Figure 8A:
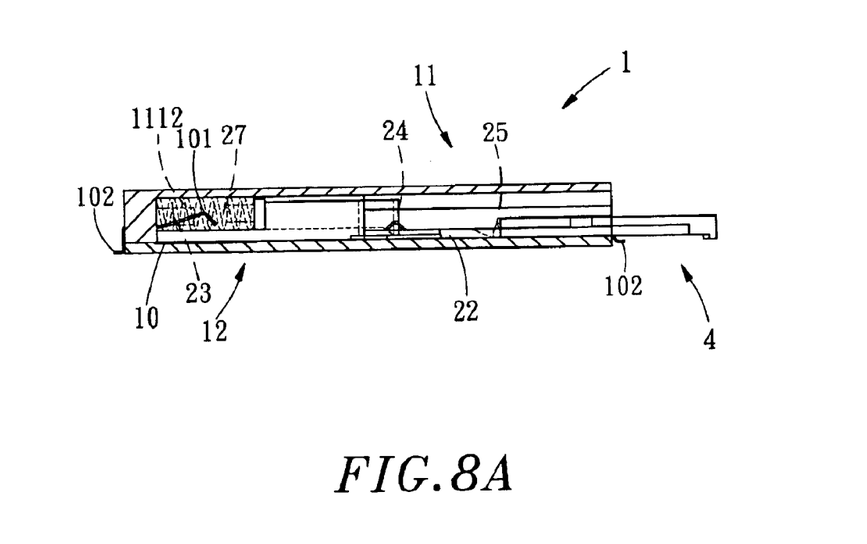
FIG. 8A is a side view of FIG. 8.

Referring to FIGS. 1 through 3, a multipurpose memory card connector in accordance with the present invention is shown comprising an electrically insulative housing 1, and a slide 2.

The electrically insulative housing 1 comprises a holder shell 11 and a cover plate 12. The holder shell 11 comprises a receiving open chamber 110 having a set of terminals 10 disposed at the rear side (remote from the front open side of the receiving open chamber 110), two guide rods 1112 disposed at two sides of the set of terminals 10 and horizontally extended forwards in direction toward the front open side of the receiving open chamber 110, a plurality of guide grooves 111 disposed in the front open side of the receiving open chamber 110, and two sliding grooves 1111 bilaterally disposed above the guide grooves 111. The cover plate 12 is covered on the holder shell 11, having a plurality of sliding tracks 121 on the bottom surface and two sets of terminals 10 mounted therein.

The slide 2 is mounted in the receiving open chamber 110 inside the electrically insulative housing 1, having two sliding faces 21 symmetrically disposed at two sides and respectively coupled to the sliding grooves 1111 to guide movement of the slide 2 in the housing 1, a first stop face 22 disposed at the inner side, a second stop face 23 and a third stop face 24 respectively disposed remote from the first stop face 22, a push block 25 disposed at the inner side, the push block 25 having a plurality of top projecting rods 251 respectively inserted into the sliding tracks 121, and two spring members 26 bilaterally backwardly extended from the push block 215 and respectively sleeved onto the guide rods 1112 and stopped; against the rear part of the holder shell 11 inside the receiving open chamber 110. The spring members 26 impart a forward pressure to the slide 2. Thus, any of a variety of memory cards 3 can be inserted into the electrically insulative housing 1 to contact the terminals 10 in the holder shell 11, and automatically ejected out of the holder shell 11 when desired. The stop faces 22, 23 and 24 are adapted to alternatively stop a respective specific memory card in the holder shell 11.

The aforesaid terminals 10 each have a contact end 101 and a bonding end 102. The contact ends 101 of the terminals 10 are respectively suspended in the receiving open chamber 110 inside the electrically insulative housing 1. The bonding ends 102 of the terminals 10 are respectively extended out of the electrically insulative housing 1 for soldering to a circuit board (not shown). The bonding ends 102 of the terminals 10 in the inner side inside the receiving open chamber 110 of the electrically insulative housing 1 are respectively extended out of the rear side of the electrically insulative housing 1 and soldered to respective contacts at the circuit board. The bonding ends 102 of the terminals 10 near the front open side of the receiving open chamber 110 of the electrically insulative housing 1 are respectively extended out of the front and two opposite lateral sides of the electrically insulative housing 1 and soldered to respective contacts at the circuit board.

Referring to FIGS. 3, 3A, 4 and 4A, the multipurpose memory card connector is compatible to MS memory card. When inserted a MS memory card 3 from the guide grooves 111 into the inside of the slide 2, the MS memory card 3 touches the first stop face 22 and pushes the slide 2 backward, thereby causing the sliding faces 21 to be moved with the slide 2 along the sliding grooves 1111 into position. When set into position, the contacts 31 of the MS memory card 3 are maintained in contact with the contact ends 101 of the terminals 10 at the rear side inside the receiving open chamber 110, and at the same time the spring force of the spring members 26 holds the top projecting rods 251 of the push block 125 positively in the sliding tracks 121 in position. When pressing the MS memory card 3 again, the top projecting rods 251 of the push block 25 are released and allowed to move in the sliding tracks 121, and the spring members 26 immediately push the MS memory card 3 backwards toward the outside of the receiving open chamber 110 of the electrically insulative housing 1 when the user released the hand from the MS memory card 3. Therefore, two continuous presses at the MS memory card 3 form a cycle of automatically loading and unloading of the MS memory card 3.

Referring to FIGS. 5, 5A, 6 and 6A, the multipurpose memory card connector is compatible to SD memory card. When inserted a SD memory card 3 from the guide grooves 111 into the inside of the slide 2, the SD memory card 3 touches the second stop face 231 and pushes the slide 2 backward, thereby causing the sliding faces 21 to be moved with the slide 2 along the sliding grooves 1111 into position. When set into position, the contacts 31 of the SD memory card 3 are maintained in contact with the contact ends 101 of the corresponding terminals 10 at the rear side inside the receiving open chamber 110, and at the same time the spring force of the spring members 26 holds the top projecting rods 251 of the push block 25 positively in the sliding tracks 121 in position. When pressing the SD memory card 3 again, the top projecting rods 251 of the push block 25 are released and allowed to move in the sliding tracks 121, and the spring members 26 immediately push the SD memory card 3 backwards toward the outside of the receiving open chamber 110 of the electrically insulative housing 1 when the user released the hand from the SD memory card 3. Therefore, two continuous presses at the SD memory card 3 form a cycle of automatically loading and unloading of the SD memory card 3.

Referring to FIGS. 7, 7A, 8 and 8A, the multipurpose memory card connector is compatible to XD memory card. When inserted a XD memory card 3 from the guide grooves 111 into the inside of the slide 2, the XD memory card 3 touches the third stop face 24 and pushes the slide 2 backward, thereby causing the sliding faces 21 to be moved with the slide 2 along the sliding grooves 1111 into position. When set into position, the contacts 31 of the XD memory card 3 are maintained in contact with the contact ends 101 of the corresponding terminals 10 at the rear side inside the receiving open chamber 110, and at the same time the spring force of the spring members 26 holds the top projecting rods 251 of the push block 25 positively in the sliding tracks 121 in position. When pressing the XD memory card 3 again, the top projecting rods 251 of the push block 25 are released and allowed to move in the sliding tracks 121, and the spring members 26 immediately push the XD memory card 3 backwards toward the outside of the receiving open chamber 110 of the electrically insulative housing 1 when the user released the hand from the XD memory card 3. Therefore, two continuous presses at the XD memory card 3 form a cycle of automatically loading and unloading of the XD memory card 3.

A prototype of multipurpose memory card connector has been constructed with the features of FIGS. 1~8. The multipurpose memory card connector functions smoothly to provide all of the features discussed earlier.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. A multipurpose memory card connector comprising an electrically insulative housing and a slide mounted inside said electrically insulative housing and adapted to receive one of a set of memory cards, wherein:

said electrically insulative housing comprises a receiving open chamber, said receiving open chamber having a front open side for the insertion of one of said memory cards and a plurality of guide grooves symmetrically disposed at two sides of said front open side and adapted to guide one of said memory cards into said receiving open chamber, a first set of terminals disposed at a rear side inside said receiving open chamber for the contact of one said memory card, and at least one second set of terminals disposed near said front open side of said receiving open chamber for the contact of one said memory card respectively;

said slide is mounted inside said receiving open chamber of said electrically insulative housing and movable in said receiving open chamber upon insertion of one said memory card, having a first stop face disposed at a rear bottom side thereof and at least one second stop face respectively spaced from said first stop face at a distance, said first stop face and said at least one second stop face being adapted to receive insertion force from one said memory card for enabling said slide to be moved in said receiving open chamber at a distance subject to the type of the memory card being inserted into said receiving open chamber.

2. The multipurpose memory card connector as claimed in claim 1, wherein said electrically insulative housing comprises a plurality of sliding tracks; said slide comprises a push block disposed at an inner side thereof, said push block having a plurality of top projecting rods respectively inserted into said sliding tracks of said electrically insulative housing and adapted to guide movement of said slide in said receiving open chamber, and two compressible spring members bilaterally backwardly extended from said push block and respectively stopped against a rear part of said electrically insulative housing.

3. The multipurpose memory card connector as claimed in claim 1, wherein said at least one second stop face includes one second stop face disposed at two sides of one set of terminals of said electrically insulative housing near said front open side of said receiving open chamber.

4. The multipurpose memory card connector as claimed in claim 1, wherein said at least one second stop face includes two second stop faces respectively disposed at two sides of two sets of terminals of said electrically insulative housing near said front open side of said receiving open chamber.

5. The multipurpose memory card connector as claimed in claim 1, wherein said electrically insulative housing further comprises two sliding grooves bilaterally disposed above said guide grooves inside said receiving open chamber; said slide further comprises two sliding faces respectively coupled to said sliding grooves of said electrically insulative housing and adapted to guide movement of said slide in said receiving open chamber along said sliding grooves.

6. The multipurpose memory card connector as claimed in claim 1, wherein the terminals of said first set of terminals and said at least one second set of terminals each have a contact end disposed inside said receiving open chamber for the contact of one said memory card, and a bonding end extended out of said electrically insulative housing for soldering to an external circuit board.

\* \* \* \* \*